United States Patent
Yamazaki et al.

(10) Patent No.: US 6,803,963 B2
(45) Date of Patent: Oct. 12, 2004

(54) MOBILE COMMUNICATIONS UNIT WITH TELECONFERENCING CAPABILITY WHEN OPEN AND DIGITAL CAMERA FEATURE WHEN CLOSED

(75) Inventors: Akihisa Yamazaki, Saitama (JP); Izumi Miyake, Saitama (JP); Makoto Isozaki, Tokyo (JP); Takeshi Misawa, Saitama (JP); Kentaro Tokiwa, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 355 days.

(21) Appl. No.: 09/998,657

(22) Filed: Dec. 3, 2001

(65) Prior Publication Data

US 2002/0067924 A1 Jun. 6, 2002

(30) Foreign Application Priority Data

Dec. 5, 2000 (JP) ........................... 2000-369902

(51) Int. Cl.$^7$ ................... H04N 5/225; H04N 7/14; H04M 1/00
(52) U.S. Cl. ................ 348/375; 348/14.02; 455/556
(58) Field of Search ............... 348/335, 340, 348/373–376, 14.02, 14.01, 552; 455/556.1, 556.2, 575.1, 90.01, 556

(56) References Cited

U.S. PATENT DOCUMENTS 6,069,648 A * 5/2000 Suso et al. ............... 348/14.02
D435,526 S * 12/2000 Huang et al. ............... D14/130
2003/0040346 A1 * 2/2003 Fukuda ........................ 455/575
2003/0125079 A1 * 7/2003 Park et al. ................... 455/556
2004/0014488 A1 * 1/2004 Sawayama et al. ....... 455/550.1

FOREIGN PATENT DOCUMENTS

| JP | 10-4540 | 1/1998 | ............ H04N/7/14 |
| JP | 10-65780 | 3/1998 | ............ H04M/1/02 |
| JP | 10065780 A | * 3/1998 | ............ H04M/1/02 |

* cited by examiner

Primary Examiner—Wendy R. Garber
Assistant Examiner—Jeremy R. Elder
(74) Attorney, Agent, or Firm—Sughrue Mion, PLLC

(57) ABSTRACT

A camera having a first part and a second part with the second part being substantially the same size as the first part. A hinge mechanism couples an end of the first part with an end of the second part such that the first part and the second part can pivot around the hinge mechanism for the first part and the second part to be folded over and aligned with each other to close. An information input/output part has at least one projecting part that is provided on and projects from the first part. An accommodation part is provided on the second part for accommodating the projecting part of the information input/output part when the first part and the second part are folded over to close such that an image of a subject can be captured by the information input/output part while accommodated into the accommodation part.

13 Claims, 6 Drawing Sheets

MOBILE COMMUNICATIONS UNIT WITH TELECONFERENCING CAPABILITY WHEN OPEN AND DIGITAL CAMERA FEATURE WHEN CLOSED

This patent application claims priority based on Japanese patent application No. 2000-369902 filed on Dec. 5, 2000, the contents of which are incorporated herein by reference.

BACKGROUND OF THE INVENTION

1. Field of the Invention

The present invention relates generally to a camera. More particularly, the present invention relates to a camera having a receptacle for accommodating into the camera body thereof at least a portion of an information input/output part, such as, for example, an optical system, that projects from the camera body such that an image can be captured while the projecting portion of the information input/output part is housed in the receptacle.

2. Description of the Related Art

In recent years, portability of cameras has rapidly improved. Cameras, however, need an optical system of some size to maintain image quality. The portability of a retractable compact camera is improved by accommodating an optical system into the body of the camera by retracting the projecting portion of the optical system while not in use. In this case, however, the retractable mechanism itself interferes with making the camera compact. Both Japanese Patent Applications Laid-Open Nos. 10-4540 and 10-65780 disclose accommodating an optical system without employing a retractable mechanism.

However, the aforementioned conventional cameras suffer from the following shortcomings. Japanese Patent Application Laid-Open No. 10-4540 has a reflection part that is rotatable in front of the lens, thereby complicating the mechanisms around the lens. In Japanese Patent Application Laid-Open No. 10-65780, a video camera part rotates with respect to a camera body and, therefore, there is a possibility that wires twisted by the rotation may be disconnected or detached.

SUMMARY OF THE INVENTION

Therefore, it is an object of the present invention to provide a camera capable of preventing the foregoing difficulties or problems accompanying the conventional cameras.

According to the present invention, a camera includes a first part and a second part, the second part having substantially the same size as the first part. A hinge mechanism couples an end of the first part with an end of the second part, and allows the first part and the second part to pivot around the hinge mechanism such that the first part and the second part are folded over and aligned with each other to close. An information input/output part has at least one projecting part that is provided on and projects from the first part.

An accommodation part is provided on the second part for accommodating the projecting part of the information input/output part when the first part and the second part are folded over to close such that an image of a subject can be captured by the information input/output part while accommodated into the accommodation part.

In an aspect of the present invention, the information input/output part comprises an optical system for capturing the image of a subject. In one preferred embodiment of the present invention, the accommodation part comprises an aperture through which the image of a subject is captured by using the optical system while accommodated into the accommodation part. In another preferred embodiment of the present invention, the accommodation part comprises a transparent member through which the image of a subject is captured by using the optical system while accommodated into the accommodation part. The transparent member may comprise a conversion lens.

The camera further includes an image capturing element having a vertical dimension of a receiving surface thereof substantially equal to a horizontal dimension of the receiving surface. The image of a subject captured by the optical system is converted into an electric signal.

In another aspect of the present invention, the camera further includes a communication unit for wireless communication and for transmitting an image obtained by the optical system. A display part is provided on the first part of the camera for displaying the image obtained via the optical system. The camera further includes a voice input part provided at an end of the second part spaced away from the hinge mechanism for inputting voice during the communication.

In still another aspect of the present invention, the information input/output part includes a voice output part for outputting voice. The voice output part projects beyond the projecting part of the information input/output part in an optical axis direction of the information input/output part. In a preferred embodiment of the present invention, the voice output part projects beyond the optical system in an optical axis direction of the optical system.

In still another aspect of the present invention, the camera further includes a barrel retaining the optical system and a movable member arranged around the barrel. The movable member moves between a first position where an end of the member projects beyond a tip of the barrel in an optical axis direction of the optical system and a second position where the end of the member is backward of the tip of the barrel in the optical axis direction thereof.

In still another aspect of the present invention, the camera further includes a barrel retaining the information input/output part and a movable member arranged around the barrel. The movable member moves between a first position where an end of the member projects beyond a tip of the barrel and a second position where the end of the member is backward of the tip of the barrel.

This summary of the present invention does not necessarily describe all necessary features so that the invention may also be a sub-combination of these described features.

DETAILED DESCRIPTION OF THE INVENTION

The invention will now be described based on preferred embodiments, which do not intend to limit the scope of the present invention, but rather to exemplify the invention. All of the features and the combinations thereof described in the embodiments are not necessarily essential to the invention.

Figure 1:
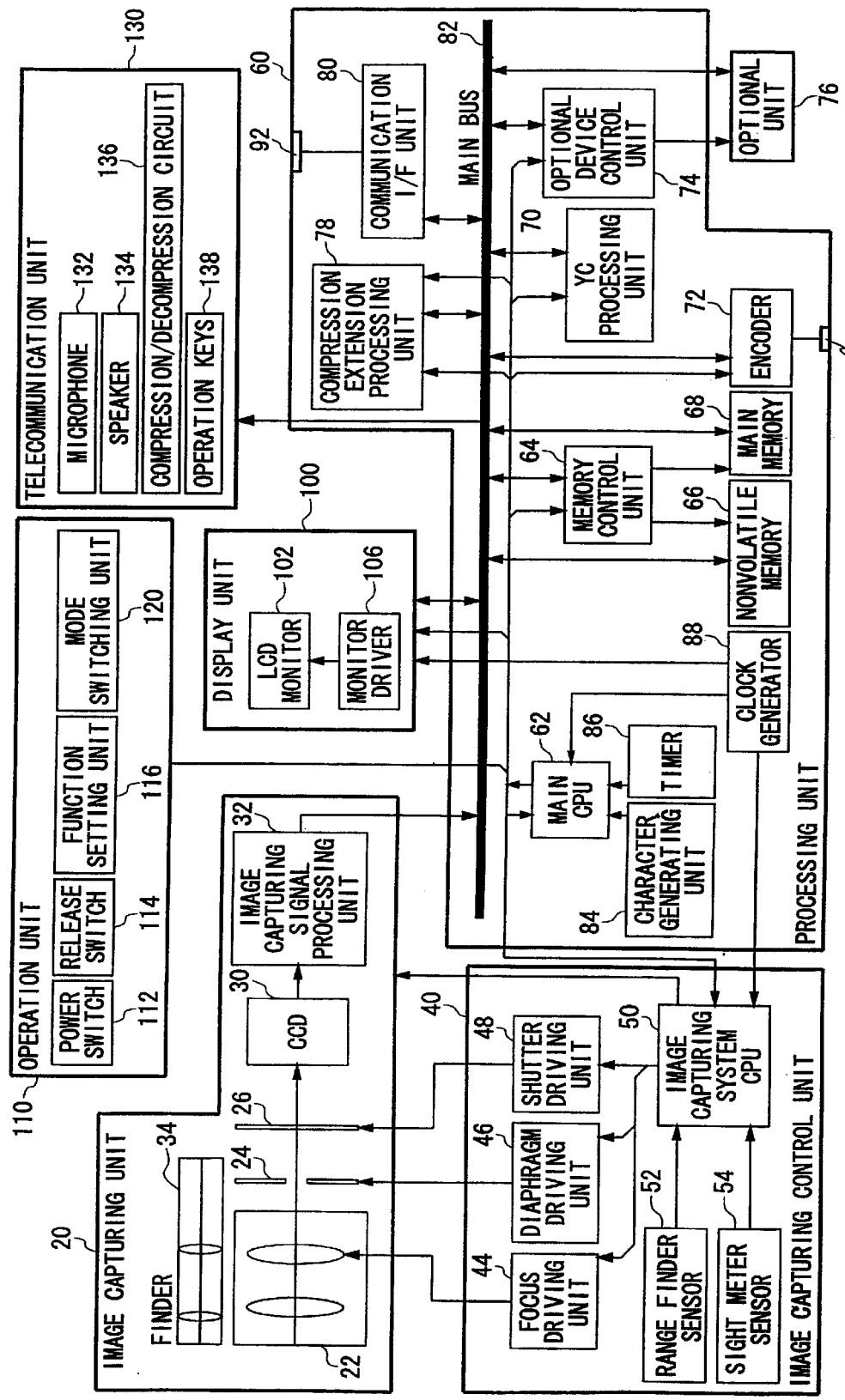
FIG. 1 is a block diagram of a digital camera in accordance with an embodiment of the invention.

FIG. 1 is a block diagram of digital camera 10 in accordance with an embodiment of the present invention. Digital camera 10 includes image capturing unit 20, image capturing control unit 40, processing unit 60, display unit 100, operation unit 110, and communication unit 130.

Image capturing unit 20 includes a mechanical member and an electrical member for capturing and image-forming. Image capturing unit 20 includes optical system 22 for taking a picture image, diaphragm 24, shutter 26, CCD 30 and image capturing signal processing unit 32. Optical system 22 is one example of an information input/output part inputting optical information from the outside and includes a focus lens. By these components, an image of the subject is image-formed on a receiving surface of CCD 30. Corresponding to a quantity of light of the image of the subject which is image-formed, electric charge is stored in each sensor element (not shown) of CCD 30 (such an electric charge is hereinafter called "stored charge"). The stored charge is read out to a shift register (not shown) by a lead gate pulse, and sequentially read out by a register transfer pulse as voltage signal. In the present embodiment, a vertical size of CCD 30 is substantially equal to a horizontal size thereof. Therefore, a ratio between the horizontal dimension and the vertical dimension of an image to be captured is almost the same whether photographing with a camera that is held vertically or horizontally.

Digital camera 10 generally includes the function of an electric shutter, and thus a mechanical shutter such as shutter 26 depicted in FIG. 1 is not required. For the electric shutter function, a shutter drain is provided in CCD 30 through a shutter gate. When the shutter gate is driven, the stored charge is output to the shutter drain. By controlling the shutter gate, it is possible to control the time, namely a shutter speed, for storing electric charge in each sensor element.

Voltage signal output from CCD 30, namely an analog signal, is color-divided into R, G, and B components by way of image capturing signal processing unit 32, and then a white balance is adjusted at first. Successively, image capturing signal processing unit 32 performs gamma compensation. R, G, and B signals are sequentially A/D converted in a necessary timing manner. And, digital picture image data thus obtained are output to processing unit 60.

Image capturing unit 20 further includes finder 34. Finder 34 may include an LCD (not shown). In such a case, various types of information from main CPU 62 described hereinafter can be displayed in finder 34.

Image capturing control unit 40 has focus driving unit 44, diaphragm driving unit 46, shutter driving unit 48, image capturing system CPU 50 for controlling driving units 44, 46 and 48, range finder sensor 52, and sight meter sensor 54. The driving units such as focus driving unit 44 have driving mechanisms such as stepping motors and the like. Corresponding to a pushing operation of release switch 114, which will be described below, range finder sensor 52 measures a distance to the subject, and sight meter sensor 54 measures the brightness state of the subject. Data of the measured distance (hereinafter "range finder data") and data of the brightness state of the subject (hereinafter "sight meter data") are sent to image capturing system CPU 50. Image capturing system CPU 50 adjusts focus of optical system 22 by controlling focus driving unit 44 based on image capturing information such as a focus position indicated by the user.

Image capturing system CPU 50 determines a shutter speed and a value for adjusting a diaphragm size based on the integrated value of the RGB digital signals, namely AE information, of one picture image frame. In accordance with the determined value, diaphragm driving unit 46 adjusts the diaphragm size and shutter driving unit 48 performs the operations of opening and closing shutter 26.

When the user has indicated that the image should be taken, CCD 30 starts to store the electric charge. After the shutter time calculated based on the sight meter data has passed, the stored charge is output to image capturing signal processing unit 32.

Processing unit 60 includes main CPU 62, memory control unit 64, YC processing unit 70, optional device control unit 74, compression extension processing unit 78, and communication I/F unit 80. Main CPU 62 controls whole digital camera 10, especially processing unit 60 itself. Memory control unit 64, YC processing unit 70, optional device control unit 74, compression extension processing unit 78, and communication I/F unit 80 are controlled by main CPU 62. Main CPU 62 transacts necessary information with image capturing system CPU 50 by a serial communication. The clocks that operate main CPU 62 are supplied from clock generator 88. Clock generator 88 provides clocks with respective different frequencies to image capturing system CPU 50 and display unit 100.

Character generating unit 84 and timer 86 are provided to main CPU 62 in a parallel manner. Timer 86 is backed up by a battery, and the time of day is counted up continuously. Information with respect to the capturing time of day and other time information are supplied to main CPU 62 based on this counted value. Character generating unit 84 generates characteristic information such as telephone number, information on the party called, the capturing time of day, a title, and the like, and this characteristic information is synthesized to a capturing image in a suitable manner.

Memory control unit 64 controls nonvolatile memory 66 and main memory 68. Nonvolatile memory 66 is composed of EEPROM (electrically erasable and programmable ROM), a FLASH memory, and so forth. Data such as setting information by the user and setting at the time of shipping out, which should be kept even if electric power of digital camera 10 is shut off, are stored therein. It may be possible for a boot program, a system program, etc. of main CPU 62 to be stored in nonvolatile memory 66, if necessary. On the other hand, main memory 68 is composed of a memory, such as DRAM in general, which is comparatively cheap and has a large capacity. Main memory 68 has functionality as a frame memory for storing data output from image capturing unit 20 or communication unit 130, functionality as a system memory for loading various kinds of programs, and functionality as other work areas. Nonvolatile memory 66 and main memory 68 transact data with respective elements inside and outside processing unit 60 through main bus 82.

YC processing unit 70 performs YC conversion to digital image data, and thus generates brightness level signal Y, a chromatic (chroma) signal B-Y, and a signal R-Y. The brightness level signal and the chromatic signal are temporally stored in main memory 68 by memory control unit 64. Compression extension processing unit 78 reads out the brightness level signal and the chromatic signal sequentially from main memory 68 and then compresses the signals. The data compressed (hereinafter "compressed data" is simply used) in this way is written out in a memory card, which is a kind of optional unit 76, by way of optional device control unit 74.

Processing unit 60 further has encoder 72. Encoder 72 inputs the brightness level signal and the chromatic signal, the signals are then converted into video signals (NTSC or PAL signals), and then the signals are output from video output terminal 90. When the video signals are generated from data recorded in optional unit 76, the data thereof are supplied to compression extension processing unit 78 by way of optional device control unit 74 at first. Next, data to which a necessary extension process is performed by compression extension processing unit 78 are converted into the video signals by way of encoder 72.

Optional device control unit 74 performs signal generation, logical conversion and voltage conversion required between main bus 82 and optional unit 76 in accordance with a signal specification recognized by optional unit 76 and a bus specification of main bus 82. Digital camera 10 may support a standard I/O card based on PCMCIA if desired, for example, other than the above mentioned memory card as optional unit 76. In such a case, optional device control unit 74 may be formed of a bus control LSI for PCMCIA and so forth.

Communication I/F unit 80 performs a control operation of protocol conversion corresponding to a communication specification, for example, specifications of USB, RS-232C, Ethernet, and so forth, supported by digital camera 10. Communication I/F unit 80 includes a driver IC if required, and communicates with external devices including networks through connector 92. It is possible to provide a unique I/F to transact data among external devices such as a printer, a "KARAOKE" player, and a game machine, for example, other than said standard specification.

Display unit 100 includes LCD monitor 102 as one example of a display unit for displaying the image. LCD monitor 102 is controlled by monitor driver 106, which is the LCD driver. LCD monitor 102 is more or less 2 inches in size, for example, and displays a mode of communication and capturing at the present time, telephone number, the residual amount of a battery, the time of day, the screen for setting a mode, subject image, and the received image.

Operation unit 110 includes a mechanism and an electric member required for the user to set or indicate operation modes of digital camera 10. Power switch 112 determines an ON/OFF condition of the electric power of digital camera 10. Release switch 114 has a pushing structure of a half push and a full push. As an example, AF and AE are locked by the half push, and the captured image is taken by the full push. After necessary signal processing and data compression are performed, the photographed images are recorded in main memory 68, optional unit 76, and so forth. Mode switching unit 120 switches a camera mode, a communication mode, and a TV & telephone mode which are selected by a user sliding a button. Operation unit 110 may include therein a rotatable mode dial, a device's plus key and other like switches, and these are referenced as function setting unit 116 in general in FIG. 1. For instance, a function or operation designated by operation unit 110 include "File Format", "Special Effect", "Printing Image", "Decision/Storing", "Switching a display", and so forth.

Communication or telecommunication unit 130 includes a mechanical member and an electrical member to talk on a telephone by a radio transmission. Communication unit 130 includes microphone 132, speaker 134, compression/decompression circuit 136 and operation key keys 138.

Microphone 132 is one example of a voice input unit into which sound is input when talking. Speaker 134 is one example of information input/output part outputting acoustic information outside camera 10. Compression/decompression circuit 136 modulates voice data converted into an electric signal by microphone 132 or image data to transmit the modulated voice or image data to a base station of a telephone company by radio transmission. Circuit 136 demodulates for example transmission received from a base station to output the received transmission to speaker 134 or LCD monitor 106. Communication unit 130 is controlled by CPU 62. When CPU 62 receives a signal to execute a communication mode or a TV & telephone mode from mode switching unit 120, CPU 62 supplies electric power to communication unit 130 and also starts communication unit 130. CPU 62 sets or adjusts modulation frequency, encryption code and an amplification ratio of a signal of circuit 136. Operation keys 138 include a key to input the telephone number of the party and a key to operate on hook/off hook function.

According to the above constitution, the main operations are described below. Electric power switch 112 of digital camera 10 is turned ON and electric power is supplied to each part of the camera. CPU 62 judges that digital camera 10 is either in the camera mode, the communication mode, or the TV & telephone mode by reading a state of mode switching unit 120.

When digital camera 10 is set to the camera mode, CPU 62 monitors a state when release switch 114 is half pushed. When a half-push of release switch 114 is detected, CPU 62 obtains sight meter data and range finder data from sight meter sensor 54 and range finder sensor 52, respectively. Image capturing control unit 40 is operated based upon the obtained data, and focus or diaphragm of optical system 22 is adjusted. Successively, CPU 62 monitors a state where release switch 114 is fully pushed. When release switch 114 is fully pushed, shutter 26 is closed after the shutter button has been pushed for a predetermined time, and stored charge from CCD 30 is output to image capturing signal processor 32. Digital image data generated from a resulting process by image capturing signal processor 32 are output to main bus 82. Digital image data are stored into main memory 68 for the moment; after that, YC processor 70 and processor 78 accept the data for processing; and data are then recorded into optional device 76 via control unit 74. The user can view a captured image on LCD monitor 102 later.

On the other hand, when digital camera 10 is set to the communication mode, digital camera 10 enables a telephone conversation using communication unit 130. When the user dials the telephone number of any party by using the operation keys 138, or manipulates the operation keys 138 upon hearing a ringing tone for a telephone call from another party, digital camera 10 starts to communicate with radio transmission. When the user speaks into microphone 132, microphone 132 converts the input sound into voice data. Circuit 136 modulates the converted voice data and transmits the data to a terminal of the other party. Circuit 136 receives the voice data transmitted from the other party and demodulates the data. Speaker 134 converts the demodulated voice data into voice to output the speech.

When in the TV & telephone mode, circuit 136 modulates the image data obtained by image capturing unit 20 and transmits the data to the terminal of the other party. When image data is received from the other party, circuit 136 demodulates the received image data and outputs the data to display unit 100. LCD monitor 102 displays the demodulated image data as an image.

Figure 2A:
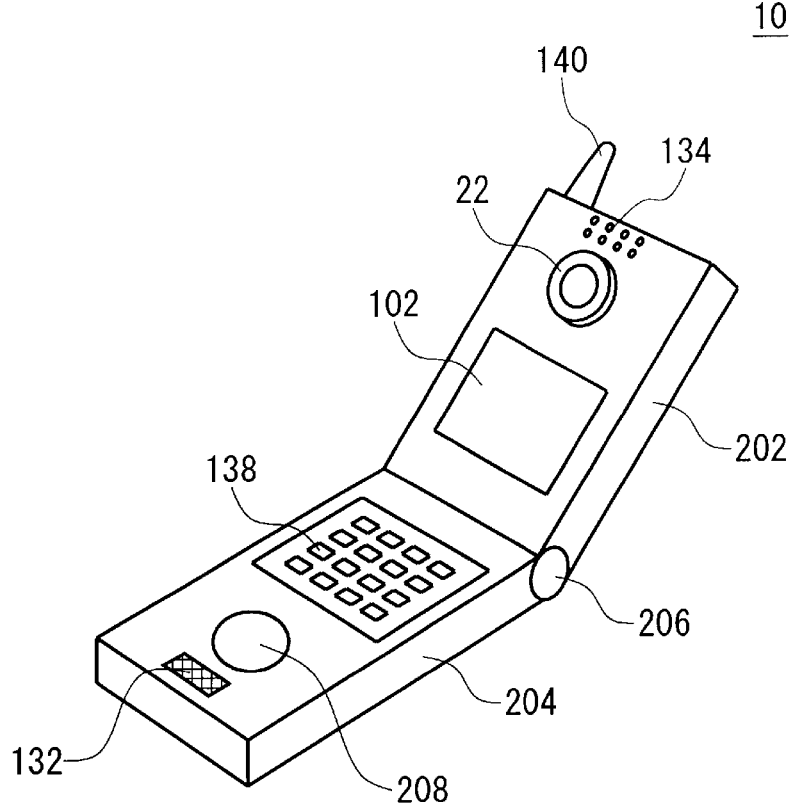
FIGS. 2A and 2B are perspective views of the digital camera.
Figure 2B:
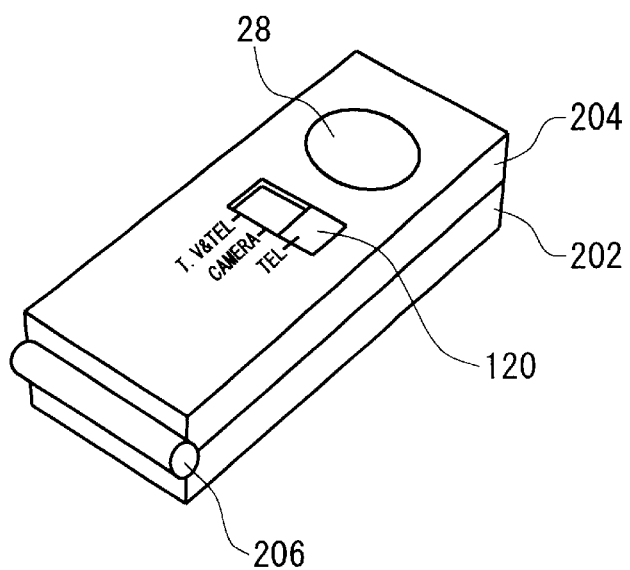

FIGS. 2A and 2B are perspective views of digital camera 10 according to the present invention. Digital camera 10 is provided with speaker 134 on a first or one side body 202 and microphone 132 on a second side body 204. Side body 202 and side body 204 are coupled at respective ends by hinge mechanism 206. Therefore, digital camera 10 can be closed by folding down the side body 202 and side body 204, as shown in FIG. 2B. In addition, digital camera 10 can be opened so that side body 202 is moved away from side body 204, as shown in FIG. 2A, by pivoting around the hinge mechanism.

As shown in FIG. 2A, side body 202 is provided with speaker 134 for outputting voice, optical system 22 for capturing images and LCD monitor 102 on a face that matches with a corresponding face of side body 204 when camera 10 is folded. Optical system 22 needs to extend lengthwise in an optical axis direction thereof to provide a focus distance. Therefore, optical system 22 partially projects from side body 202. LCD monitor 102 is provided on the same face of side body 202 as optical system 22. This arrangement permits the user to view the image received by LCD monitor 102 while facing towards optical system 22 so as to capture the user's own image when communicating in the TV & telephone mode with digital camera 10. Antenna 140 is provided at an end of side body 202 opposed to hinge mechanism 206.

Operation keys 138, microphone 132 and accommodation part 208 are provided on a face of side body 204 that matches with and is aligned with side body 202 when camera 10 is closed. As shown in FIG. 2B, mode switching unit 120 is provided on an opposite face to the face of camera 10 on which operation keys 138 are provided.

Microphone 132 is provided at an end away from hinge mechanism 206 of side body 204. More specifically, microphone 132 is provided between an end of side body 204 and accommodation part 208 on side body 204. The end is opposed to hinge mechanism 206 of side body 204.

Accommodation part 208 is a depressed portion of side body 204 into which a projecting portion of optical system 22 can be accommodated. Accommodation part 208 accommodates almost all of the projecting portion of optical system 22 when digital camera 10 is folded over to closed position. Therefore, entire side body 202 and entire side body 204 can be aligned almost completely with each other when camera 10 is closed. Transparent member 28 is provided at the bottom of the depressed portion 208 (not shown in FIG. 2A). Transparent member 28 is provided so as to be aligned with the optical axis of optical system 22 when optical system 22 is accommodated into accommodation part 208. Transparent member 28 allows an image to be captured using optical system 22 when optical system 22 is accommodated into accommodation part 208. Preferably, transparent member 28 is a conversion lens.

Figure 3:
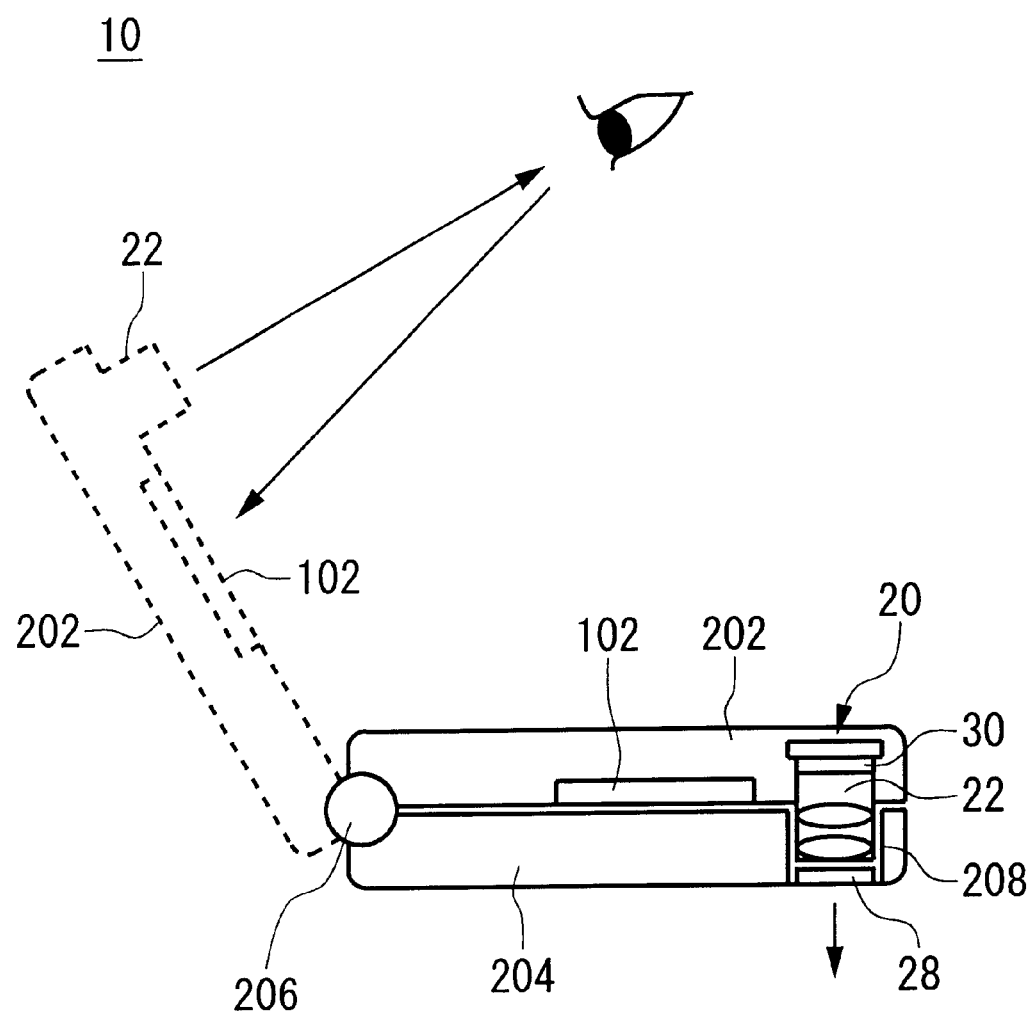
FIG. 3 is a schematic cross-sectional view of the digital camera.

FIG. 3 is a schematic view of a cross-section of digital camera 10. In the present embodiment, when digital camera 10 is in the TV & telephone mode, digital camera 10 is used with side body 202 in an open position as shown with a dotted line in FIG. 3. The user talks on the telephone while viewing LCD monitor 102. At this time, simultaneously, image capturing unit 20 performs image capturing of the user.

On the other hand, when digital camera 10 is in the camera mode, digital camera 10 is used in a closed state as shown in FIG. 3 with a solid line. When digital camera 10 is closed, optical system 22 is accommodated into accommodation part 208. Since transparent member 28 is provided at the bottom of accommodation part 208 as shown in FIG. 3, digital camera 10 can perform image capturing in the direction as shown by an arrow in the closed state of the camera. Further, since transparent member 28 is a conversion lens, digital camera 10 can change a focus distance of optical system 22. For example, when wide conversion lens 28 is provided along the optical axis of optical system 22, image capturing can be carried out with a wider angle than when image capturing is carried out by only optical system 22.

Figure 4:
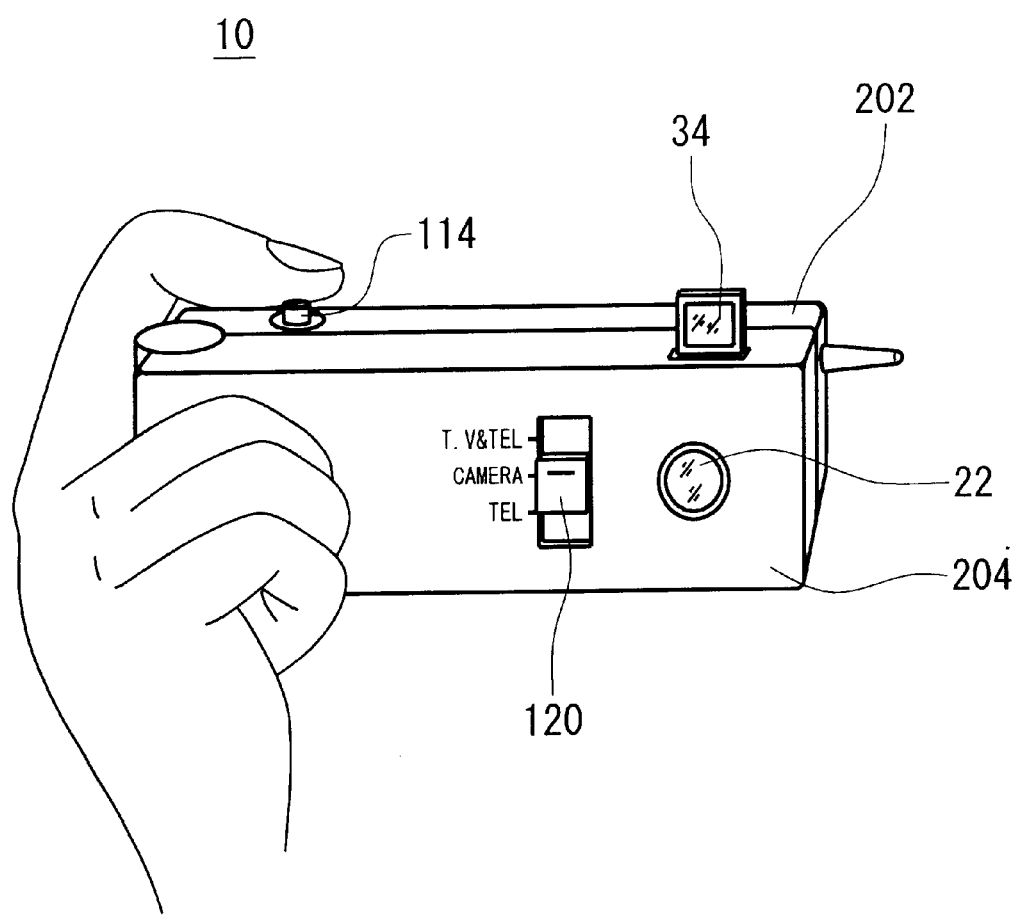
FIG. 4 shows a mode for using the digital camera in a camera mode.

FIG. 4 shows a mode for using digital camera 10 in the camera mode according to the present invention. Digital camera 10 has finder 34 and release button 114 on a side face thereof. When in the camera mode, the user holds digital camera 10 so that a rotation axis of hinge mechanism 206 is substantially perpendicular to the ground and performs image capturing as desired. In contract, when the TV & telephone mode is used, the user holds digital camera 10 so that the rotation axis of hinge mechanism 206 is substantially parallel to the ground and performs image capturing as desired. Image capturing is performed by rotating the receiving surface of image capturing element, i.e., CCD 30, by 90 degrees when in the TV & telephone mode relative to the camera mode. In the TV & telephone mode and in the camera mode, an image with the same ratio between its vertical size and its horizontal size can be captured by using image capturing element 30 so that a width in a vertical direction and a width in a horizontal direction of the receiving surface, as described in connection with FIG. 1, are substantially the same.

As described above, according to the present embodiment, an optical system that projects from the body of camera 10 is accommodated into the body by folding over a camera when the camera is carried. Thus, the optical system will not be damaged while being carried because it does not project from the body of the camera. By using a conversion lens as one example of transparent member 28, image capturing with an appropriate image angle for respective modes of the camera becomes available when in the camera mode and in the TV & telephone mode.

For example, accommodation part 208 may be an aperture so that image capturing may be accomplished using optical system 22 in a state where optical system 22 is accommodated into accommodation part 208.

When a user positions camera 10 at the user's ear to talk, digital camera 10 can be changed to a structure so that no part of the user's ear contacts optical system 22 and this prevents optical system 22 from becoming dirty.

Figure 5A:
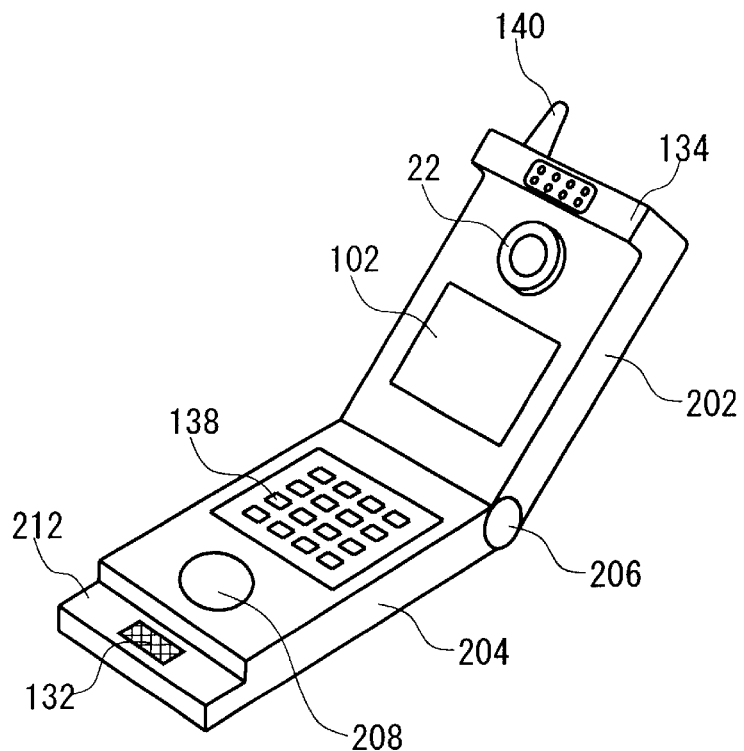
FIGS. 5A and 5B are perspective views of the digital camera having a projecting speaker.
Figure 5B:
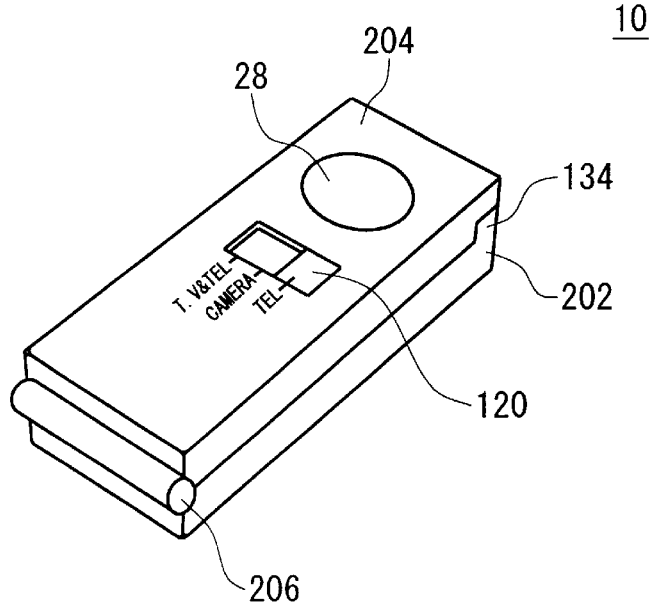

FIGS. 5A and 5B are perspective views of digital camera 10 to which the aforementioned modification is added, according to the present invention. At least one part of speaker 134 projects beyond optical system 22 in an optical axis direction of optical system 22. Therefore, when the user places speaker 134 to the user's ear, the speaker 134 supports the user's ear away from optical system 22 and this prevents the user's ear or face from directly touching optical system 22. The projecting portion of speaker 134 may be a voice output mechanism itself to output voice or a part that holds the voice output mechanism.

When side body 202 and side body 204 are folded over each other, side body 204 has an accommodation-indentation 212 to accommodate the projecting portion of speaker 134, as shown in FIG. 5A.

The accommodation part to accommodate speaker 134 is accommodation-indentation 212 at an end of side body 204 in the present embodiment. However, accommodation-indentation 212 is not necessarily located at the end. When side body 202 and side body 204 are folded over and aligned with each other as shown in FIG. 5B, projecting speaker 134 is accommodated into accommodating-indentation 212. In this case, microphone 132 may be provided on the accommodating-indentation 212.

Figure 6:
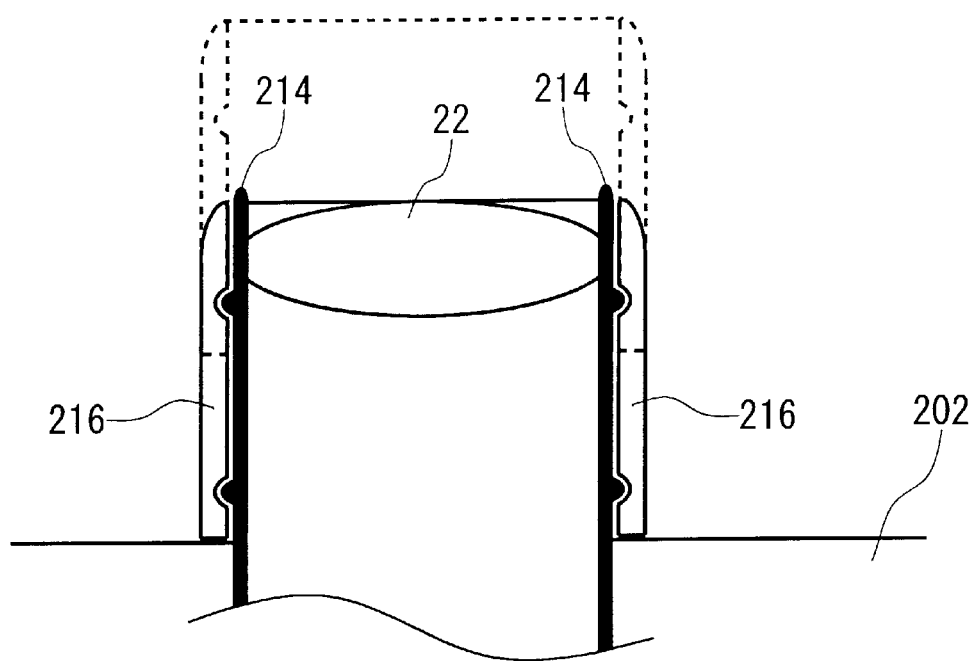
FIG. 6 is a partial cross-sectional view of the digital camera having a movable member.

FIG. 6 is a partial cross-sectional view of digital camera 10 to which a modification different from FIG. 5 is added. In a modified example as shown in FIG. 6, digital camera 10 has movable member 216 which is movable in the optical axis direction of optical system 22 around barrel 214 that holds optical system 22. Movable member 216 has a cylindrical shape. Member 216 can be arranged at a first position where an end of member 216 projects beyond a tip of barrel 214, as shown with a dotted line in FIG. 6, and at a second position where an end of member 216 is behind a tip of barrel 214, as shown with a solid line in FIG. 6. In this modified example, when the user's ear is placed at speaker 134 to talk, it is possible to prevent the ear from touching optical system 22 by locating member 216 at the first extended position. On the other hand, when digital camera 10 is used in the camera mode or in the TV & telephone mode, it is possible to prevent the end of member 216 from reflecting on an image captured using optical system 22 by moving member 216 to the second retracted position.

As is apparent from the above description, according to the present invention, when at least one part of an optical system projects from a body in a camera, the projecting portion can be accommodated into the body.

Although the present invention has been described by way of exemplary embodiments, it should be understood that many changes and substitutions may be made by those skilled in the art without departing from the spirit and the scope of the present invention which is defined only by the appended claims.

What is claimed is:

1. A camera comprising:
   a first part and a second part, said second part having substantially the same size as said first part;
   a hinge mechanism coupling an end of said first part with an end of said second part, said hinge mechanism allowing said first part and said second part to pivot around said hinge mechanism such that said first part and said second part are folded over and aligned with each other to close;
   an information input/output part having at least one projecting part that is provided on and projects from said first part; and
   an accommodation part provided on said second part for accommodating the projecting part of said information input/output part when said first part and said second part are folded over to close such that an image of a subject can be captured by said information input/output part while accommodated into said accommodation part.

2. A camera according to claim 1, wherein said information input/output part comprises an optical system for capturing the image of a subject.

3. A camera according to claim 2, wherein said accommodation part comprises an aperture through which the image of a subject is captured by using said optical system while accommodated into said accommodation part.

4. A camera according to claim 2, wherein said accommodation part comprises a transparent member through which the image of a subject is captured by using said optical system while accommodated into said accommodation part.

5. A camera according to claim 4, wherein said transparent member comprises a conversion lens.

6. A camera according to claim 2, further comprising an image capturing element having a vertical dimension of a receiving surface thereof substantially equal to a horizontal dimension of said receiving surface, and the image of a subject captured by said optical system is converted into an electric signal.

7. A camera according to claim 2, further comprising:
   a communication unit for wireless communication and for transmitting an image obtained by said optical system; and
   a display part provided on said first part of the camera for displaying said image obtained via said optical system.

8. A camera according to claim 7, further comprising a voice input part provided at an end of said second part spaced away from said hinge mechanism for inputting voice during said communication.

9. A camera according to claim 1, wherein said information input/output part comprises a voice output part for outputting voice.

10. A camera according to claim 9, wherein said voice output part projects beyond said projecting part of said information input/output part in an optical axis direction of said information input/output part.

11. A camera according to claim 2, wherein said information input/output part further comprises a voice output part for outputting voice; said voice output part projects beyond said optical system in an optical axis direction of said optical system.

12. A camera according to claim 2, further comprising:
   a barrel retaining said optical system; and
   a movable member, arranged around said barrel, for movement between a first position where an end of said member projects beyond a tip of said barrel in an optical axis direction of said optical system and a second position where said end of said member is backward of said tip of said barrel in said optical axis direction.

13. A camera according to claim 1, further comprising:
   a barrel retaining said information input/output part; and
   a movable member, arranged around said barrel, for movement between a first position where an end of said member projects beyond a tip of said barrel in an axial direction thereof and a second position where said end of said member is backward of said tip of said barrel.

* * * * *